US006247097B1

(12) United States Patent
Sinharoy

(10) Patent No.: US 6,247,097 B1
(45) Date of Patent: Jun. 12, 2001

(54) ALIGNED INSTRUCTION CACHE HANDLING OF INSTRUCTION FETCHES ACROSS MULTIPLE PREDICTED BRANCH INSTRUCTIONS

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/235,474

(22) Filed: Jan. 22, 1999

(51) Int. Cl.⁷ .................................................. G06F 12/00
(52) U.S. Cl. ............................. 711/125; 711/123; 711/213
(58) Field of Search .................................... 711/123, 125, 711/126, 137, 213; 712/239, 240

(56) References Cited

U.S. PATENT DOCUMENTS

| | | | |
|---|---|---|---|
| 5,136,697 | * 8/1992 | Johnson | 712/239 |
| 5,301,289 | * 4/1994 | Suzuki et al. | 711/213 |
| 5,530,825 | * 6/1996 | Black et al. | 711/213 |
| 5,634,119 | * 5/1997 | Emma et al. | 712/240 |
| 5,669,001 | 9/1997 | Moreno | 717/6 |
| 5,699,536 | 12/1997 | Hopkins et al. | 712/216 |
| 5,815,699 | * 9/1998 | Puziol et al. | 712/239 |
| 6,112,293 | * 8/2000 | Witt | 712/216 |
| 6,141,747 | * 10/2000 | Witt | 712/225 |

\* cited by examiner

*Primary Examiner*—Matthew Kim
*Assistant Examiner*—Fred F. Tzeng
(74) *Attorney, Agent, or Firm*—Lynn L. Augspurger; Lawrence D. Cutter; Bernard M. Goldman

(57) ABSTRACT

An aligned Instruction cache (AIC) containing multiple instruction cache sectors in which may be recorded out-of-sequence blocks of instructions. Basic blocks of instructions are aligned in AIC sectors at program run time. An AIC directory uses the current instruction address to select an AIC directory entry and an associated row in the AIC containing multiple sectors. The AIC directory entry contains multiple "Sector S first address" fields respectively associated with the multiple AIC sectors, each of these directory fields containing the address of the first instruction in the associated AIC sector S when its contents are valid. A "fetch history table" (FHT) contains four FHT entries for each associated AIC row organized in FHT sets of four entries. Each valid FHT entry records a predicted sequence of instructions based on a prior actual execution of the sequence in the same program, which may repeat over and over again. Each FHT entry contains very efficient fields for capturing a previous history of execution for a sequence of blocks of instructions which may be non-sequentially located in memory. Each valid FHT entry can control an outgating of multiple sequences of instructions stored in the sectors of the associated AIC row in a single fetch cycle. Each fetch cycle using a single FHT entry may outgate for execution by the processor a plurality of AIC sectors in any order recorded in the FHT entry, without the processor waiting to fetch these instructions from disparate locations in memory.

24 Claims, 8 Drawing Sheets

FIGURE 1: HARDWARE CONFIGURATION.
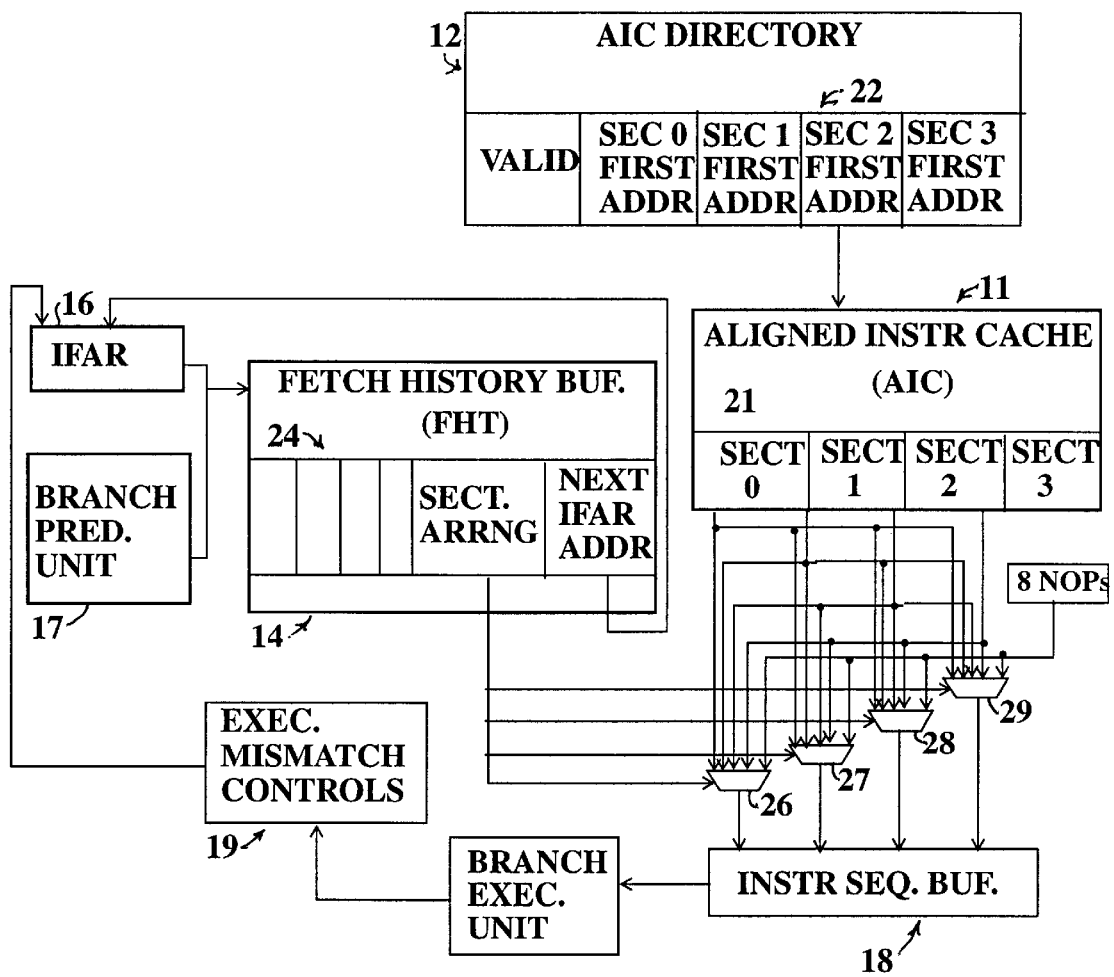

FIGURE 2A: AIC DIRECTORY
(512 ENTRIES, DIRECT-MAPPED)
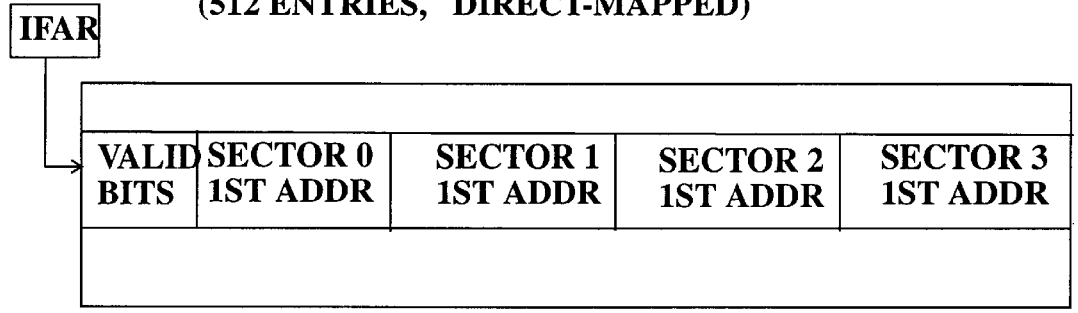
FIGURE 2B: FETCH HISTORY TABLE ENTRY
| VALID BITS | LRU BITS | FIRST INSTRUCTION ADDRESS | SECTOR BRANCHES OUTCOMES | SECTOR ARRANGE- MENTS | NEXT IFAR ADDR |
|---|---|---|---|---|---|
|  |  |  |  |  |  |

FIGURE 3: CORRESPONDENCE BETWEEN ALIGNED I-CACHE (AIC) AND FETCH HISTORY BUFFER (FHT)
FETCH HISTORY TABLE
(4*512 ENTRIES)
| | | | | | |
|---|---|---|---|---|---|
| 1 | 11 | T | 0*0* | 0123 | Z |
| 1 | 10 | T | 11** | 0244 | Y |
| 1 | 01 | T | 10** | 0234 | Z |
| 1 | 00 | T | 0*1* | 0124 | Y |
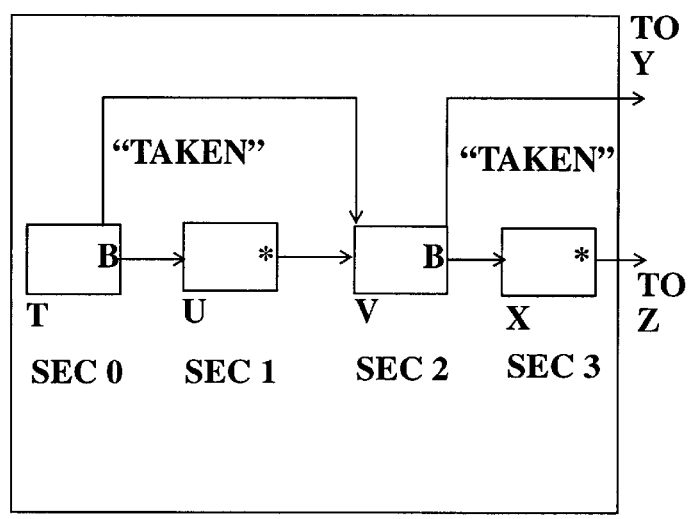
ALIGNED I-CACHE
(512 ENTRIES, DIRECT-MAPPED)

FIGURE 4 (INITIALIZATION AND PRIMARY PATH)

```
                              401
                    START PROGRAM EXECUTION
                              |
                              V                  402
        SET IFAR = FIRST PROGRAM INSTRUCTION ADDRESS
                              |
                              V                              403
    (A) OBTAIN A PREDICTION FOR THE NEXT "m" BRANCHES IN A PROGRAM,
        STARTING WITH A TARGET INSTRUCTION AT THE CURRENT IFAR ADDRESS.
        (THE PREDICTION PROVIDES A "BRANCHES OUTCOME PREDICTION VECTOR"
        CONTAINING A BIT FOR EACH CURRENTLY PREDICTED BRANCH HAVING
        A BIT-STATE FOR INDICATING A BRANCH PREDICTION OF EITHER TAKEN OR
        NOT-TAKEN. THE VECTOR BITS ARE LOCATED BY A VECTOR BIT COUNT B.)
                              |
                              V                  404
    SEARCH DIRECTORY OF ALIGNED I-CACHE (AIC) FOR AN AIC ROW R
    CONTAINING AN INSTRUCTION AT IFAR ADDRESS.    |
            |                                     |
            |                                     | (AIC MISS)
            | (AIC HIT)                           V
            |                                     GO TO FIG. 5,(H)
            V                  406
    SEARCH FHT ENTRIES IN FHT SET ASSOCIATED WITH ROW R TO SEE IF THERE
    IS A "FHT HIT" FOR THE "OUTCOME PREDICTION VECTOR".   |
                      |                                    |
                      | (FHT HIT)                          | (FHT MISS)
                      |                                    V
                      |                                    GO TO FIG.7,(F)
                      V                  407
    OBTAIN THE "SECTOR ARRANGEMENT FIELD" AND THE
    "NEXT IFAR ADDRESS" FIELD FROM THE HIT FHT ENTRY.
    OUTGATE THE SECTORS FROM THE AIC ROW R IN THE
    ORDER SPECIFIED BY THE "SECTOR ARRANGEMENT" FIELD
    IN THE FHT ENTRY. (A 0 IN A SUBFIELD OF THE "SECTOR
    ARRANGEMENT" FIELD INDICATES NO MORE SECTORS
    ARE TO BE OUTPUTTED IN THE CURRENT FETCH CYCLE.)
                              |
                              V                  408
    ADJUST THE LRU FIELD TO REFLECT THE HIT FHT ENTRY AS THE
    MOST RECENTLY USED AMONG FHT ENTRIES IN THIS FHT SET.
                              |
                              V                  409
    STORE INTO IFAR THE "NEXT IFAR ADDRESS" IN THE HIT ENTRY.
                              |
                              V
                        GO TO FIG.4,(A)
```

FIGURE 5 (AIC MISS)

(H) FROM FIGURE 4
|
| (AIC MISS)
501 V
    SET COUNT S = 0.
    SET THE VECTOR BRANCH BIT COUNT B = 0.
      |
      V                              502
USE CURRENT IFAR ADDRESS TO SELECT AN AIC ROW R, AND TO SELECT AN
ASSOCIATED FHT ENTRY SET. INVALIDATE ALL SECTORS OF THE AIC ROW R, AND
INVALIDATE ALL FHT ENTRIES IN ASSOCIATED FHT SET.
      |
503 V
    SELECT AN INVALID FHT ENTRY IN THE FHT SET AS THE
    CURRENT FHT ENTRY F IN THE FHT SET,
    STARTING WITH THE "INITIAL" FHT ENTRY.
      |
      V                            504
    STORE IFAR ADDRESS IN S-TH "SECTOR FIRST ADDRESS" FIELD
    IN FHT DIRECTORY ENTRY.
      |
      V                            506
(C) FETCH INSTRUCTIONS IN ADDRESS SEQUENCE FROM A
    "MEMORY LINE" OF THE STORAGE HIERARCHY CONTAINING
    THE INSTRUCTION LOCATED AT THE ADDRESS IN IFAR;
    START FETCHING INSTRUCTIONS AT THE IFAR ADDRESS, AND
    STOP FETCHING AFTER ANY BRANCH IS DETECTED OR
    AFTER LT NUMBER OF INSTRUCTIONS ARE FETCHED,
    WHICHEVER OCCURS FIRST.        GENERATE COUNT L AS THE
    NUMBER OF ACTUAL INSTRUCTION FETCHED FROM THE "MEMORY LINE".
    INCREMENT VECTOR BIT COUNT B TO B + 1 IF A BRANCH IS DETECTED.
      |
      V                            508
    STORE SEQUENCE OF FETCHED INSTRUCTIONS BOTH INTO THE ISC,
    AND INTO SECTOR S OF AIC ROW R STARTING AT THE LEFT SIDE OF
    SECTOR S TO ALIGN THE FETCHED INSTRUCTIONS IN THE SECTOR.
    WRITE NOP INTO EACH INSTRUCTION POSITION IN SECTOR
    NOT RECEIVING A FETCHED INSTRUCTION.
      |
      V                            509
    STORE IFAR ADDRESS IN S-TH "SECTOR S ADDRESS" FIELD
    IN AIC DIRECTORY ENTRY R.
      |
      V
    GO TO FIG.6,(I)

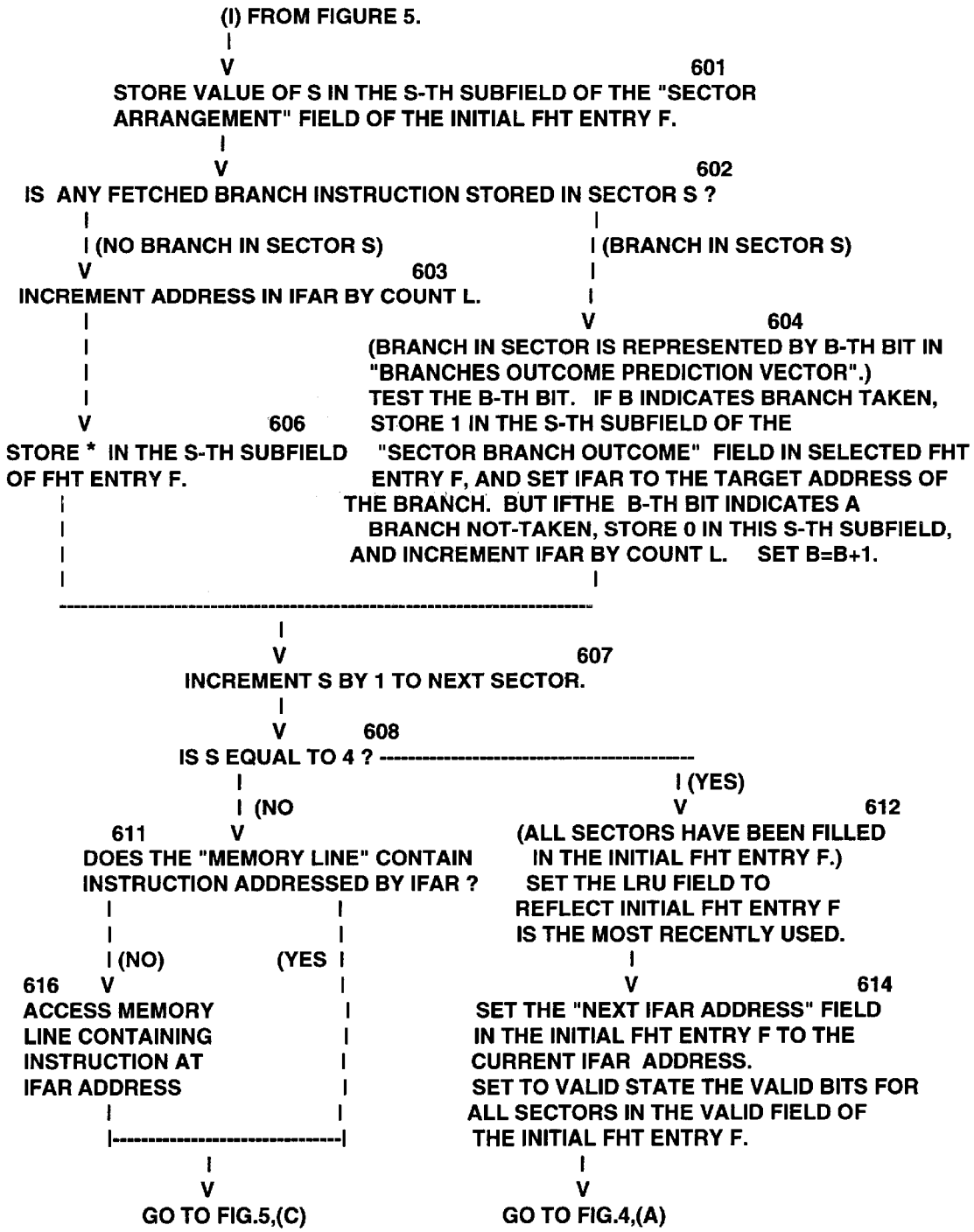

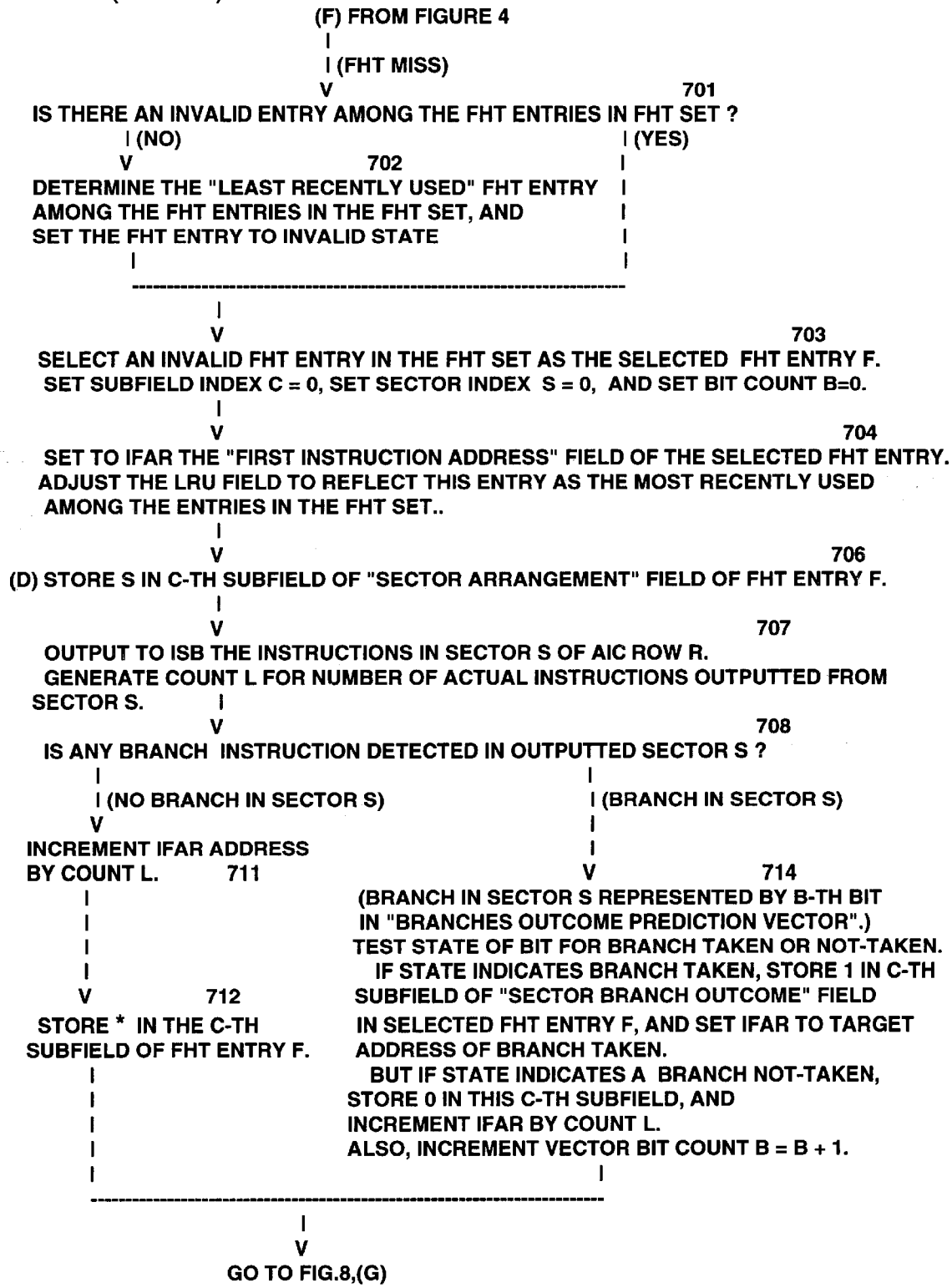

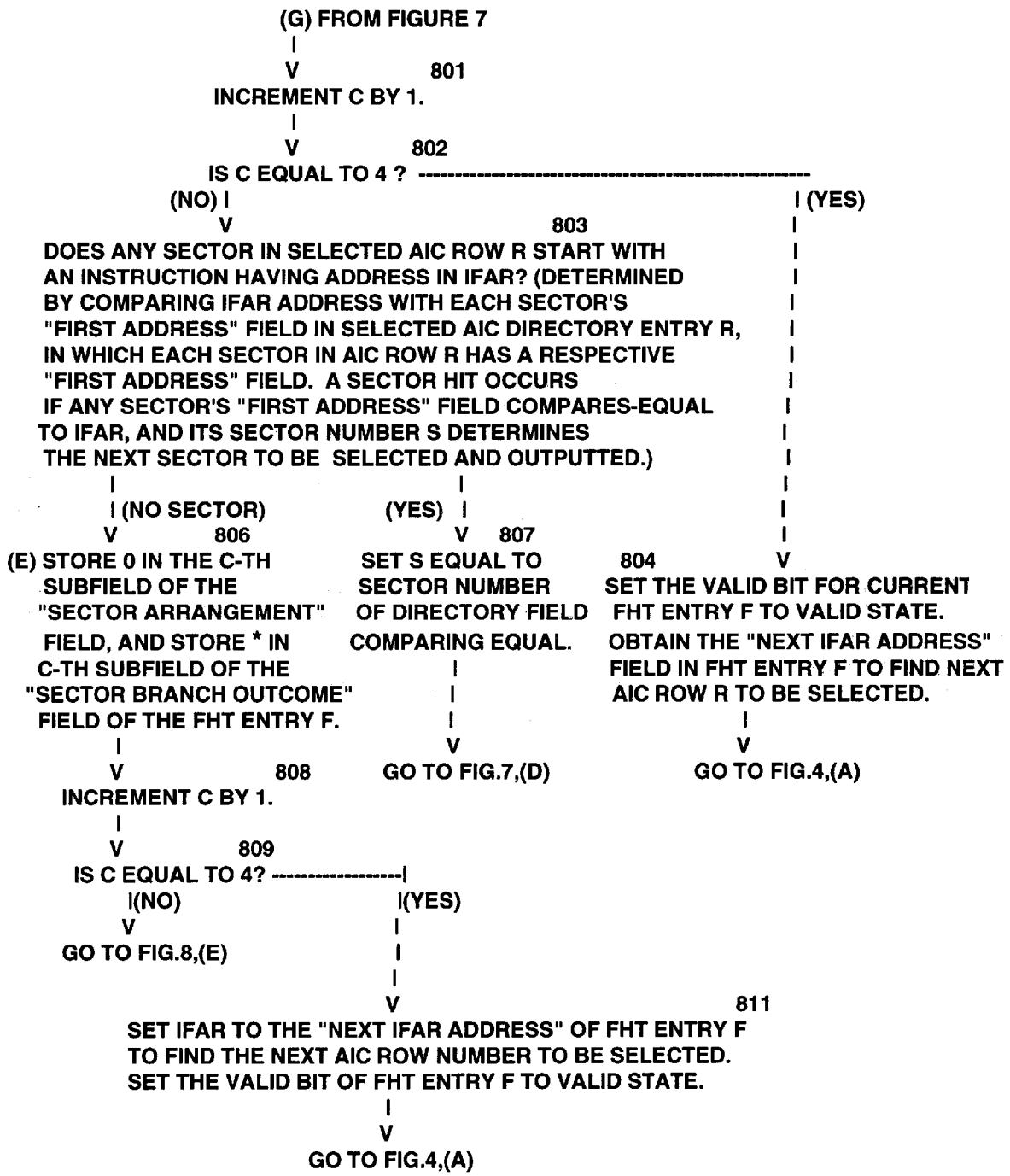

ALIGNED INSTRUCTION CACHE HANDLING OF INSTRUCTION FETCHES ACROSS MULTIPLE PREDICTED BRANCH INSTRUCTIONS

This invention generally deals with enabling processors to increase their speed of fetching instructions for executing programs. More specifically, this invention generates a fetch history table that directly operates with an instruction cache for delivering memory-accessed instructions to processor execution hardware (such as instruction execution pipelining hardware) for fetching multiple-predicted basic blocks in a single fetch cycle.

BACKGROUND

To understand this invention, it is essential that the basic block characteristic of all computer programs be understood as background. Programs .are linearly stored in a storage hierarchy, including in a processors main memory, which causes all instruction locations therein to have a linear characteristic. However, when these instructions are executed by the processor, the processor is required by the branch instructions in the program to use nonlinear sequencing of these same instructions linearly obtained from the hierarchy. Thus, the execution sequence of all computer programs is determined by the branch instructions contained in each program. The execution of each program breaks up the program into basic blocks, each starting with a target instruction of a branch instruction and ending with a branch instruction which provides the target address beginning the next basic block in the instruction execution sequence of the program. Any basic block may contain any number of instructions, from one instruction (a branch instruction) to a very large number of instructions (such as thousands of instructions). The processor fetches instructions fastest if they are sequentially located in memory, and slowest if the instruction is the target of a branch, requiring the processor to intervene and perform a target address calculation and often go elsewhere in memory to find the instruction, such as obtaining page faults that greatly slow the processing. Often, short basic blocks are responsible for great degradation in the performance of a processor.

An abundance of conditional branches in programs impede instruction fetching mechanism of modern processors. To support execution of significantly larger number of instructions per cycle, future microprocessors will have to support speculative fetching and execution of large number of instructions. Method described here can speculatively fetch instructions across multiple conditional branches (with different target addresses) in each cycle, based on dynamic multilevel branch predictions and code reorganization during compilation or instruction cache loading.

Over the last decade, microprocessor performance has increased at the rate of about 60% per year. To keep up the performance improvement rates, future microprocessors will have to execute (and commit) significantly larger number of instructions per cycle. Non-numerical workloads are ladened with conditional branches which makes the superscalar processor implementation difficult. In one study, it has been shown that average C programs have about 18% of their instructions being conditional branches and C++ programs have about 11% of their instructions being conditional branches (on RS/6000 platform). These limit the sizes of the basic blocks to only 6 to 10 instructions. These necessitates speculative execution beyond basic blocks.

Most processors employ sophisticated branch prediction mechanism to predict the path to be taken by a conditional branch and its target address. However, these are used only to predict the outcome of the next conditional branch to be executed. Due to small sizes of the basic blocks and the increased need for speculation, future microprocessors will have to predict the outcome of multiple branches in a single cycle with high degree of accuracy and be able to fetch instructions from the target addresses of these branch instructions in a single cycle.

To give a better idea, many path-based correlated dynamic branch prediction algorithm can provide branch prediction with accuracy as high as 97% for many non-numerical workload (such as SPECint). With such a high accuracy, predicting the outcome of four successive conditional branches can be made with an accuracy of 88.5%. Similarly, three successive conditional branches can be predicted with 91.3% and two successive conditional branches can be predicted with 94.1% accuracy. This means that, with an average basic block size of 6 instructions, the expected number of instructions speculatively executed that end up being in the taken path is 28.3 with four level of branch prediction (versus only 11.8 instructions with a single level of branch prediction).

As the branches gets further away from the current point of execution, the accuracy with which they can be predicted decreases. Ability to fetch a large number of instructions can greatly enhance the number of instructions that can be executed in a given cycle within the constraints of data, control and structural hazards.

Each computer program is comprised of a set of instructions stored in a permanent memory of a computer system in storage-location sequence, which may also be represented by a virtual-address sequence to a processor fetching the program for executing it. The fetched sequence of instructions is resolved by the processor into an instruction execution sequence which usually differs significantly from the program's storage-location sequence due to branch instructions in the programs.

Thus, programs are generally stored in a permanent computer memory (such as a hard disk) in their virtual-address sequence, which is generally used by processors to transfer portions of a program (such as in page units) into the computer system's random access memory, and then a processor fetches lines of the program in the memory using the virtual-addresses of the program for execution by the processor. The fetched lines often are put into an instruction cache in the executing processor.

Therefore, the instruction execution sequence of a program in the processor does not occur in the program's instruction compiled sequence, wherein the instruction execution sequence is determined by the branch instructions executed in each program, resulting in the program's architected instruction execution sequence. Not pertinent to this invention is the so-called out-of-sequence instruction execution found In some complex processors which nevertheless must follow the program's architected instruction execution sequence.

Each program architected execution sequence of instructions is dependent on the data used by a particular execution of the program, and varying data may unpredictably vary a program's execution sequence of instructions. The data will often control whether a branch instruction is taken or not taken. A not-taken branch instruction generates a target address to the next instruction in the virtual-address sequence of the program. A taken branch instruction generates a target address to a non-sequential instruction at any virtual address.

The instruction fetch mechanisms in all processors operate fastest as long as they are accessing sequential instructions in the virtual address sequence, because then each next instruction address is generated by merely incrementing the current instruction address to generate the next sequential instruction address, which often is the next sequential instruction in the same line in the processor cache (cache hit) from which it can be immediately provided to the processor for execution.

However, a taken branch may involve the additional overhead of having to fetch the target instruction at a location which is not currently in the cache (a cache miss), which then initiates a fetch cycle for copying another line containing that target instruction from the memory into the cache. It is well known that taken branch instructions slow down the fetch rate of instructions needed for program execution in any processor, due to the taken branch instructions deviating from the virtual-address sequence of instructions in a program.

Consequently program execution is slowed by taken branch instructions when their target instructions are not fetched until the actual target address is actually known, which involves delays for fetching additional lines into the processors I-cache. Thus extra overhead is involved in the processor handling of taken branch instructions, since it introduces additional processing delays during which the processor waits for their target instructions to be received by its execution pipeline in this manner, taken-branch-instruction handling slows the processing of programs to increase the execution time of the programs.

In the prior art, each taken branch instruction initiates a fetch cycle, during which a processor fetches one or more basic blocks. A basic block is comprised of one or more instructions having sequential addresses in memory (real or virtual) in which the last instruction is a branch-type of instruction. A branch-type of instruction is a conditional or unconditional branch or a return instruction or a call instruction. The target address of the branch type of instruction ending a basic block starts a next basic block.

The prior Collapsing Buffer approach has several disadvantages to determine the instructions within a cache line that should be fetched. First, it requires a highly interleaved (equal to the number of instructions in the I-cache line) branch target buffer (BTB). Second, it needs to have entry in the BTB for all the branches in the cache line from which instructions are being fetched. Third, to create a bit vector representing which instructions should be fetched from within the cache line, it has a series of address comparators (comparing the four plus the previous instructions address with the target address of the last branch instruction). The number of the comparators in the series is equal to the number of instructions within the cache line. This can significantly reduce the processor clock.

Branch Address Cache (BAC) has been proposed, where each entry stores a portion of the control flow graph. BAC extends the BTB so that instead of a single branch target, the target and fall-through addresses of multiple branches are stored. Branch targets and fall-through paths are filled in during execution if there is no entry found in the BAC for a fetch-address. However, there could be holes in the entry due to not having executed some of the branches. However the paper does not give good description of how to eliminate the intervening instructions between a branch and its target that are unused. An approach similar to the collapsing buffer is needed for this purpose.

The approach presented here does not have any of these drawbacks. Moreover, it uses the hints generated by the compiler or the cache reload logic, to achieve high bandwidth fetching across several branches. Compiler-based approach is expected to produce better results, since the compiler can see the entire subprograms during code generation, encoding of all the path information can be obtained more accurately and so there will not be any hole in the branch target information that is kept in the fetch history table.

A prior "trace cache" technique for controlling the processor fetching of instructions is proposed in an article by E. Rotenberg, S. Bennett and J. Smith entitled "Trace Cache: a Low Latency Approach to High Bandwidth Fetching", Apr. 11, 1996. In the Rotenberg et al article, a trace cache operates with a "core fetch unit" containing an instruction cache (I-cache). The core fetch unit also contains a branch target buffer (BTB), BTB logic, and a multiple branch predictor. The core fetch unit uses a sequence of fetch cycles to fetch instructions from main memory into its I-cache.

Each fetch cycle may include one or more basic blocks in a currently predicted program path from the branch predictor. The fetch cycle includes all instructions in a path matching a previous path traced and stored in a trace cache line associated with the same program address in the program. The current fetch cycle ends whenever it mismatches with the path stored in the addressed trace cache line. The information representing the current trace cache line is stored in a trace tag cache directory entry associated with the trace cache line.

The trace tag cache is made up of a trace buffer, a trace tag directory, and a trace line-fill buffer and logic. The trace tag directory contains control information.

The length of a trace is limited in two ways—by a number of instructions n and by a number of basic blocks m, of which n is limited by the peak dispatch rate of the processor, and m is limited by the average number of branch predictions per fetch cycle. The control information in each entry in the trace tag directory is: a valid bit, a tag field containing a starting address, a branch flags field having (m−1) bits in which each bit represents a branch within the trace to indicate the path followed after each branch instruction (taken or not taken), a branch mask field for indicating: (1) the number of branches in the associated trace, and (2) whether or not the trace ends in a branch, a trace fall-through address field containing the address of the next fetch if the branch is not taken and a trace target address field alternatively containing the next fetch address if the branch is taken.

All 16 entries in the Rotenberg et al BTB operate in parallel with the 16 instructions in a selected trace tag cache line to check each instruction therein for being a branch instruction. The branch prediction logic uses a Global Address correlated branch predictor (GAg) and a single pattern history table. BTB logic combines BTB hit information with the branch predictions to produce the next fetch address and to generate a valid instruction bit vector.

The Rotenberg et al trace cache, BTB, and instruction cache are all accessed in parallel while a multiple branch prediction is made by the predictor logic. A trace cache hit requires for the current trace directory entry: (1) the actual fetch address match the tag field, and (2) the branch prediction match the branch flag field. On a trace cache miss, fetching proceeds normally in the conventional manner from the I-cache without using trace cache information. However, during this conventional fetching process, a trace cache entry is generated and put into the trace cache, and a corresponding trace cache directory entry is generated. As instructions are conventionally fetched into the I-cache, each basic block being transferred into an I-cache line is also being transferred from the I-cache into a line-fill buffer until m number of basic blocks or n number of instructions (equal a full cache line) are stored in the line-fill buffer. Then, the content of the line-fill buffer is transferred into the current line in the trace cache obtained by the current fetch address. Simultaneously, a corresponding trace directory entry is being generated by the generation of its branch flag, branch mask, and either its fall-through address or its target address as required for the next fetch cycle.

A downside of a simple trace cache is that for each starting fetch address, only a single trace entry can be stored in the trace cache and a single corresponding entry is stored in the trace directory. Hence, different paths from the same fetch address in a program require different trace cache entries and different corresponding trace directory entries; this can result in a large number of trace entries for each fetch address in a program in which different paths are followed from the address during a program execution. This severely restricts the efficiency of the trace cache due to its inefficient use of the trace cache and trace directory entries, since programs often branch back to a prior-executed instruction and follow a different path therefrom in subsequent iterations through the program.

Thus, the Rotenberg et al system requires a trace cache with an I-cache. The subject invention does not use a trace cache and does not use the system organization found in Rotenberg et al.

SUMMARY OF THE INVENTION

The subject invention provides a novel fetch history table for operating with a novel aligned I-cache (preferably structured with a plurality of cache sectors).

The subject invention includes a mechanism that allows instructions to be fetched from targets of multiple branches whose outcomes are predicted by a sophisticated and reliable branch prediction mechanism, and which operates with a segmented instruction cache.

This invention uses instruction cache sectoring controls to re-order machine code involving aligning basic blocks of instructions into I-cache sectors. Such instruction alignment is done at run-time by using instruction cache reload/access logic to incorporate implementation-dependent features in the object code. Programs are linearly located in main memory in an implementation-independent manner without reflecting the organization required by the processor for execution, and implementation-specific aspects are introduced by the processor operations for the execution process. This allows for object-code execution compatibility among processors with different internal organizations. The subject invention is able to significantly reduce processor time loss caused by execution of branch instructions in a program.

Novel hardware provided in the invention includes an "aligned instruction cache" (AIC), an AIC directory, and a "fetch history table" (FHT). A novel process is used by this novel hardware to obtain the operations required in the subject invention.

The AIC is a sectored instruction cache which sector aligns sequential groups of fetched instructions. That is, each basic block stored in the AIC is sector-aligned by having its first instruction located in the first instruction storage location in a sector, and the other instructions in the sector are in the same basic block at location-sequential addresses in memory. Since the basic blocks in a program may greatly vary in their number of instructions, a basic block may end at any instruction position in the same sector or may exceed the size of the sector. If the basic block ends in the same sector, no-operation (NOP) characters are written into the sector's instruction storage positions following the branch instruction ending the basic block. If the basic block exceeds the sector size, the basic block continues into one or more consecutive sector(s) in the AIC row and may end in any row, in which any remaining positions are filled with NOPs. A sector in the AIC row is available for use if it does not store any valid instruction. The AIC directory contains a "Sector S first address" field for each sector S in the associated AIC row, and this field contains the memory address of the first instruction in the associated sector S when its contents are indicated valid in the associated AIC directory entry. Each AIC directory entry may be located at a directory index R which is the same as the index of its associated AIC row R.

The FHT may be a direct-mapped table or a set-associative table. When it is directly mapped, the indices of the FHT entries are directly calculated from the index of the associated row R in the AIC. For example, the index of the entries in any FHT set may be calculated as: $F*R, F*R+1, F*R+2 \ldots F*R+(F-1)$, in which F is the number of FHT entries in an FHT set.

Each FHT entry contains very efficient fields for capturing a previous execution history for the sequences of instructions stored in the sectors of the associated AIC row, which may contain a plurality of basic blocks of a program. When used in a fetch cycle by this invention, a valid FHT entry causes a plurality of sectors to be immediately outputted for execution by the processor in a predicted sequence of basic block execution, without the processor waiting the usually required time it would otherwise need to fetch these instructions from disparate locations in memory.

The process taught by this invention enables each processor instruction fetch cycle to use one valid FHT entry (finding both an AIC hit and a FHT hit) to output in any sequence required by a program the instructions in the valid sectors of an associated AIC row. AIC and FHT hits can occur most of the time after a program has previously executed and developed a history recorded in its FHT entries.

If the processor has a FHT miss, the processor nevertheless executes its required instructions while recording the history of that execution in the fields of a selected FHT entry, after which a FHT hit will occur each time that same sequence of instructions again executes, provided that it occurs frequently enough for the FHT entry to not age out of the FHT (i.e. it is invalidated when age out).

A valid FHT entry enables sector gates connecting to respective columns of sectors in the AIC for outputting the selected sectors in a selected AIC row R. The sector gates are enabled in the sequence recorded in the FHT entry, causing outgating for execution by the processor of the sequences of instruction in the selected sectors in whatever order is indicated in the respective FHT entry.

The preferred embodiment efficiently records its execution history in an implementation having a "sector arrangement" field and a "sector branches outcome" field in each FHT entry, in which a subfield index relates the history contents of these fields, wherein a subfield in one field identifies the sector for which the subfield in the other field indicates a branch outcome (i.e. whether the identified sector contains a branch instruction or not and if it does whether the branch is taken or not taken). Although the preferred implementation uses two fields, it is apparent that a single field may instead be used to contain the same history information.

The history sequences recorded in the FHT entries are predicted sequences of instructions based on prior actual execution sequences in the same-program, which are expected to repeat over and over again.

This invention can simultaneously record different execution sequence histories for the valid sectors of instructions stored in the same AIC row. This is done by having more than one FHT entry associated with the same AIC row, and is implemented in the preferred embodiment by having a set of plural FHT entries associated with each AIC row. For example, if four FHT entries are provided in each FHT set, each of the four entries can record a different sector-sequence history, so that the same sectors of instructions can be executed in four different sequences of these sectors by using the four different entries in the same set.

Since each FHT entry records a single sequence of sector outgating, an FHT set can record many different sequences. A newly occurring sequence variation can be accommodated by invalidating and replacing the least-recently-used valid entry in the FHT set. Such replacement is enabled by providing each FHT entry in a FHT set with a least recently used (LRU) field to enable replacement selection.

The selection of FHT entries for use during processor operation is done by a novel FHT selection process, involving a matching of a prediction vector with a history field in the FHT entries in the FHT set. The prediction vector is related to the FHT entry by the fetch cycle. At the beginning of the fetch cycle, the prediction vector is generated by a branch predictor (which may be of the type provided in the prior art), and does not have any recognition of the existence of sectors. This invention provides a novel process for matching the vector with the sectored history stored in the valid FHT entries in the associated FHT set. Information is recorded in an FHT entry field in a form, in which the matching process can skip sector information indicating no-branch instruction exists in an identified sector and focus only on sector information indicating a branch instruction exists in an identified sector, whether it is taken or not-taken.

The preferred embodiment use an instruction sequencing buffer (ISB) for receiving instructions from the I-cache in the history sequence captured in the FHT entry in response to the FHT entry selection and actuation controls. However, instructions are outgated by this invention in their required sequence, and they may be outgated to other execution entities than the ISB, such as being sent directly to an instruction execution pipeline.

Fetch cycle completion controls are provided in the invention to indicate when an FHT entry has recorded all of the sequencing history it is capable of recording, such as when the last subfield has been recorded in the FHT entry.

The FHT recording process operates somewhat differently for the initial entry in any FHT set than for the later generated entries in the same set. The reason is the first entry is generated when the associated AIC row is filled with instructions copied from the processor memory (which instructions can also be bypassed for execution at the same time). The other FHT entries in the set are generated later when a different execution sequence occurs for the previously-filled sectors in the same AIC row.

This invention can support any sequence of outgating for the sectors in any selected AIC row, and in special situations it is desirable to indicate which of the multiple sectors is the first sector to be outgated. This is supported by providing a "first instruction address" field in each FHT entry to indicate which sector is to be first outgated in its sequence of sectors..

To save time in selecting a next AIC row after the recorded history sequence has been outgated (by often avoiding several processing steps such as target branch calculation), this invention provides a "next instruction fetch address" field in each FHT entry from which the processor can immediately determine the next AIC row likely to contain the next instruction.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

FIG. 1 shows the hardware configuration of the preferred embodiment of the invention described herein.

FIG. 2A represents the "aligned instruction cache" (AIC) and shows an example of the fields in each multi-sectored row in the AIC.

FIG. 2B shows an example of an FHT entry in the "fetch history table" (FHT).

FIG. 3 illustrates the relationship between the contents of an AIC row and the FHT entries in an associated FHT set containing the entries.

FIGS. 4, 5, 6, 7 and 8 provide a flow-diagram of the novel method used by the preferred embodiment, in which:

FIG. 4 shows the initialization and primary path through the method

FIGS. 5 and 6 show a sub-process of the method for handling the occurrence of an AIC miss.

FIGS. 7 and 8 show a sub-process of the method for handling the occurrence of a FHT miss.

DESCRIPTION OF THE DETAILED EMBODIMENT:

Acronym Definitions

AIC=Aligned Instruction Cache.

FHT=Fetch History Table.

R=Selected row in AIC.

FHT set=set of FHT entries associated with a selected AIC row.

F=Selected entry in a FHT set.

IFAR=Instruction fetch address register (contains storage address of current instruction in the process).

LRU=Least Recently Used indicator field in a FHT entry or in an AIC row.

Valid Bit=Field in a FHT entry or in an AIC row (indicates the entry or row is valid and may be used).

ISB=Instruction Sequencing Buffer (Buffer receiving instructions in execution sequence from outputted sectors of AIC).

MISS=Searched-for entry is not found in cache or table.

HIT=Searched-for entry is found in cache or table.

B=Vector bit count

S=Sector identifier count

C=Subfield Identifier Count (locates subfields in the FHT "Sector Arrangement" and "Sector Branches Outcome" fields of a FHT entry after the first entry was generated in the FHT set).

"m"=Number of predicted basic blocks in each execution sequence prediction.

L=Current number of Instructions within an AIC Sector.

LT=Total number of instruction positions in each AIC sector

ST=Total number of sectors in each AIC row.

NOP=No Operation code (indicates no instruction exists in a location containing the NOP code).

RT=Total number of row in the AIC.

FT=Total number of entries in each FHT set.

Direct Mapped FHT=The locations in the FHT of the entries in each FHT set can be calculated from the location of a corresponding row in the AIC, such as by having FT number of FHT entries for each AIC row. (That is, the indices in the FHT for the entries in each FHT set are determined from the index R of a corresponding row R in the AIC. For example, when each set in the FHT contains four FHT entries (FT=4), the indices of the four FHT entries are: 4*R, 4*R+1, 4*R+2 and 4*R+3.) For Non-Direct Mapped FHT (not having an exact index correspondence between. AIC rows and FHT entries), a "First Instruction Address" field may be required in each FHT entry.

AIC Hit: It IFAR address is "I", to determine a hit in the 512 entry direct-mapped Aligned I-Cache, we first determine the AIC row number "R" as I (mod. 512). If AIC entry "R" is valid and contains the instruction at IFAR address "I" (this information is stored in the I-cache directory), then there is a AIC hit. In the preferred embodiment, the AIC has a directory for managing accesses to the AIC rows, and a conventional congruence class algorithm is used for selecting a required AIC row using the IFAR address. The AIC may be set-associative or not. If set associative, each congruence class in the AIC has multiple rows (generally 2 or 4 rows), from which a required row is selected by a comparison between a distinguishing portion of the IFAR address (e.g. predefined bit positions in the IFAR address) and a corresponding address portion stored in each AIC row representing whatever IFAR address existed when the respective row was stored and validated. An AIC hit occurs if the compare-equal condition is found for one of the rows in the congruence class. An AIC miss occurs when the compare-unequal condition is found for all of the rows in the accessed congruence class.

FHT Hit: Determine the AIC row address "R" containing the instruction having the address currently in IFAR. For a FHT hit, we look into the valid FHT entries in rows 4*R through 4*R+3 of the FHT. If any of these FHT entries has the "First Instruction Address" field that matches the IFAR address and if the "Sector Branches Outcome" field matches the "Outcome Prediction Vector", then there is a FHT hit. When comparing the "Sector Branches Outcome" with the "Outcome Prediction Vector", an asterisk ("*") in a subfield of the "Sector Branches Outcome" field is ignored. (For example, if "Sector Branches Outcome" field is "*0*1" and the "Outcome Prediction Vector" is "0111", then there is a match, since Sector Branches Outcome" is "01" (ignoring the "*") which is a prefix of the "Outcome Prediction Vector".

Description of the Hardware and General Operation

The subject invention has novel apparatus which uses a novel process. The invention generates and matches a prediction vector with novel history containing entries in a novel hardware table control the outgating for execution of out-of-sequence instructions from a novel sectored instruction cache in which out-of-sequence sequences of instructions are aligned. The operation of this invention results in speeding up the execution of the program containing the instructions by predictively sequencing multiple out-of-sequence basic blocks of instructions in a single fetch cycle.

Although this invention concurrently executes multiple predicted instruction blocks, it relies on continuously checking its predicted branch instructions against the actual execution targets of the same branch instructions to determine if the executed predicted sequences ever deviate from the instruction sequence required by the program. It uses execution mismatch controls 19 to detect any such deviation of branch targets and then generates output correction signals that cause the instruction stream to re-start from the instruction address causing the problem. The structure of the execution mismatch controls 19 is known in the art and therefore is not show in detail herein.

FIG. 1 shows the hardware configuration of the preferred embodiment, which are the hardware elements required in a processor for it to have the subject preferred embodiment. It includes an, an "aligned instruction cache" (AIC) 11, an AIC directory 12, a "fetch history table" (FHT) 14, an "instruction fetch address register" (IFAR) 16, a "branch prediction unit" 17, an "instruction sequencing buffer" (ISB) 18, and execution mismatch controls 19. The AIC directory entry 22 is shown in FIG. 2A, and the FHT entry is shown in more detail in FIG. 2B. The AIC rows are located in the AIC at indices 0 through 511. The FHT entries are located in the FHT at indices 0 through 2047. The index R of any selected row in the AIC is used to locate an associated FHT set of four FHT entries in FHT 14 at FHT indices 4*R, 4*R+1, 4*R+2 and 4*R+3.

Each AIC row is divided into a plurality of sectors, and four sectors are shown in each row in the AIC of FIG. 1. When any sector contains valid instructions, these instructions are always sequentially located in the processor memory, and the first instruction in each AIC sector S has the memory location contained in the sector's "sector S first address" field in the associated AIC directory entry.

Each AIC directory entry is divided into five fields comprising the four "sector S first address" fields and a "valid" field containing a bit for each of the four sector address fields. Hence, contained each sector address, when valid, is the address of the first instruction in the corresponding sector in associated AIC row 21.

FIG. 3 shows an FHT set of 4 FHT entries 24A, 24B, 24C and 24D in FHT 14. Each FHT set is associated with an AIC row. The 4 entries in any set may be called entries FHT(0), FHT(1), FHT(2) and FHT(3), or they may be referred to by their respective FHT indices.

An address in IFAR 16 may simultaneously locate, associate and select one of the four sectors S (0, 1, 2 or 3) addressed by an associated AIC directory entry 22, and may select a corresponding FHT set. An AIC row 21 and its associated AIC directory entry 22 are considered selected when any of its sector addresses are selected When IFAR initially selects a set of four entries 24 in FHT 14, the first FHT entry FHT(0) in the FHT set is initially selected. Thereafter, selection of the FHT entries in the set is performed in round-robbin manner, e.g. from FHT(0) to FHT(1) to FHT(2) to FHT(3) and back to FHT(0). FHT 14 is "direct-mapped" because its FHT entry locations, are directly determined from the row addresses R in the AIC. The associated AIC directory entry is at the same address R in the directory.. That is, the index of row R allows the direct selection of its associated directory entry and the direct calculation of the address of each associated FHT entry in the associated FHT set.

In the preferred embodiment, the AIC contains 512 number of rows 21. Each row 21 contains 4 sectors, in which each sector contains 8 instruction storage positions, so that each sector can store up to 8 instructions fetched from any line of instructions stored in a system storage hierarchy (not shown). The FHT 12 contains 2048 entries 22 divided into 512 sets in which each set contains 4 entries associated with a respective row 21 in the AIC. The 4 FHT entries 22 in each set are located in the FHT at indices determined by the index of the associated row 21 in the AIC 11. The locations of the four FHT entries in a set are determined when the associated row is selected in the AIC. A selected row has an index R in the AIC, and is herein called row R. Index R of row R determines the locations of its associated FHT set containing 4 FHT entries located respectively at indices 4*R, 4*R+1, 4*R+2 and 4*R+3 in the FHT. A convention used in the preferred embodiment is to apply a hashing algorithm to the IFAR address (a cache row selection technique well known in the prior art) to generate row address R which is used herein to select the row R in the AIC directory; this technique is sometimes called "congruence class" cache row selection in the prior art.

"Sector alignment" is provided for each basic block fetched from the system memory hierarchy and copied into one or more rows of the AIC. The alignment is done by always writing the first instruction of each copied basic block into the first instruction position of an AIC sector, e.g. in position 1 of the 8 instruction storage positions in the sector, which is herein considered at the leftmost side of the sector. A basic block may start in the first position of any of the 4 sectors of any row. The basic block may have any number of instructions, and therefore it may be less than, equal to, or greater than the number of instruction positions in a single sector. If the basic block is stored in less than 8 positions of the sector, each instruction storage position in the sector unused by the basic block (which is on the right side of the branch instruction ending the basic block) is padded by writing a "no-instruction" code (NOP) in each unused instruction position. If the basic block is equal to the sector size (e.g. 8 instructions), its ending branch instruction is in the last instruction position in the sector and no NOPs are written in the sector. However, if the basic block exceeds a sector (e.g. has more than 8 instructions), instructions of the basic block are sequentially stored into each next sector of the same AIC row until the basic block ends in any sector. If the basic block exceeds the last sector of the row, it is continued in another row of the AIC; and the IFAR address (of the basic block's first instruction stored in another row) is stored in a "next IFAR address" field in a selected FHT entry in the associated set of 4 FHT entries. It is possible for a basic block to occupy any number of sectors in one or more rows in the AIC, and it is also possible for a basic block to have only a single instruction (a branch), which is located in only the first position of a sector.

The "instruction sequencing buffer" 18 receives sectors of instructions selectively outputted from the AIC. The sectors are outputted to ISB 18 in any order required by a program to provide a sequence of instruction basic blocks in any order required by any executing program for providing the instruction to an execution pipeline of a processor. The instructions are fetched from memory on demand when they are to be executed for a program and the instructions are not found in any AIC row. A large number of rows 21 are included in the AIC, in which each row contains sectors 0, 1, 2 and 3. Each sector contains 8 instruction position, in which a sequence of from 1 to 8 instruction can be stored.

The "execution mismatch controls" 19 detect if the actual target address. (provided by any executed branch instruction) mismatches with a corresponding predicted target address provided by branch prediction unit 17. Such a mismatch detected in controls 19 causes the processor to reset the execution sequence, including in the ISB, in the execution pipeline, so that the processor instruction stream backs up to the actual target address which mismatched by interrupting the current operation and loading the correct address into IFAR 16. Thus the target address of each branch instruction is checked by comparing the branch target predicted with the corresponding actual target generated by the processor execution of its branch instruction (which ends the last basic block executed in the program and provides the target address for the next basic block). If this comparison finds any predicted target address mismatches with its corresponding actual target address, an asynchronous interruption signal is provided in the processor to terminate the current fetch cycle, load into IFAR the actual target address, and to restart a fetch cycle at operation 403 which backs up the instruction stream to the corrected target address. Consequently, the correct instruction sequence is always obtained by the processor, although a slight time loss may be paid for incorrect predictions in the instruction sequencing of a program. However, statistical studies have shown that such misprediction errors are relatively rare.

FIG. 2A shows a five field AIC directory entry 22. It has a "Valid Bits" field that contains four bits which -respectively indicate the validity/invalidity of each of the four "sector address" fields in the AIC directory entry 22 and of the addressed sector in the associated AIC row 21. A 1 indicates the corresponding "sector address" field and its addressed sector are valid, and a 0 indicates they are invalid. Initially, all the four valid bits are set to 0 to indicate invalidity for the entire directory entry and for all sectors of its associated AIC row. Entry 22 also has four "sector S address" fields, which respectively correspond to the four sectors in the associated AIC row R. Each valid "sector S address" field contains the virtual address (or a unique portion thereof) of the first instruction in its associated sector S in a form which can be used by the IFAR.

FIG. 2B shows the fields in each FHT entry, which are:
(1) Valid field: One bit to indicate if the entry is valid (=1) or invalid (=0).

LRU field: 2-bits to indicate how recently the FHT entry has been used in its FHT set of four FHT entries, such as:
least recently used FHT entry, LRU bits="00"
second least recently used FHT entry, LRU bits="01"
third least recently used FHT entry, LRU bits="10"
most recently used FHT entry LRU bits="11"

First Instruction Address: Address of the first instruction in any sector in the selected AIC row having the instruction starting the instruction sequence for which this FHT entry was created. In the example shown in FIG. 3, the U in the "sector first instruction" field indicates the first instruction address in an instruction sequence represented by the sector arrangement sequence 1, 2, 0. U is the address of the first instruction in the sequence to be entered in the row for that FHT entry.

Sector Branches Outcome: This field has four subfields, each of which is associated with a respective subfield in the "sector arrangement" field of the same FHT entry For example, the second "Sector Branches Outcome" subfield indicates the branch condition in the sector identified in the second subfield in the "sector arrangement" field.,of the same FHT entry To do this, each "Sector Branches Outcome" subfield contains either 1, 0 or *, wherein a 1 indicates the identified sector ends in a "taken" branch, a 0 indicates it ends in a "not-taken" branch, and an * indicates no branch instruction exists in the identified sector. Thus, each subfield represents the branch condition in a sector identified by a sector number in a corresponding subfield in the "Sector Arrangement" field of the same FHT entry having the same subfield index. Not all of the subfields need to be valid; the valid subfields are delineated by a special character, such as a 0, following (to the right of) the last valid subfield in the associated "sector arrangement" field. Thus, a variable number of the branches can be handled in any FHT entry, which is determined by the number branch instructions in the "m" branch prediction used at the time the FHT entry was generated.

Sector Arrangement: This field has four subfields. Each subfield can contain a number from 0 through 4, in which 0 to 3 are the identifiers of respective sectors 0–3, and 4 indicates no sector. The left-to-right order of the subfields indicates the sequence of identified sectors to be forwarded to the Instruction Sequencing Buffer (ISB) in the current fetch cycle. For example, if this field has sector identifiers "1,2,0,4", then sectors 1, 2 and 0 are forwarded to the ISB, in that order. The 4 in the last subfield indicates that no instructions are to be forwarded to the ISB for the last subfield (represented by the 4) in the current fetch cycle. Another example, "2321" would indicate that sectors 2, 3, 2 again, and then 1 (in that order) would be forwarded to ISB in a single fetch cycle.

Next IFAR Address: This field indicates the IFAR address to be used in the following fetch cycle.

In FIG. 3, if a sector contains a taken branch, the taken path is illustrated by the curved arrow labeled "taken" to the target of the branch at the beginning of another sector, or to another AIC row. The taken path can actually go to the beginning of any sector within the same AIC row or to any sector in another AIC row. When the branch is not-taken, the not-taken path is shown in FIG. 3 by a horizontal arrow to the next following sector. When a sector contains a branch, no actual instructions follow the branch within its sector, and if the branch is taken or not taken and not in the last instruction in a sector, each remaining instruction position in the sector is padded with a NOP code.

Each fetch cycle performed by the invention begins with an instruction in the program having its address set into IFAR 16. It is presumed that at least the part of the program containing the IFAR instruction was previously executed, and that the past branching history of the program was retained from the IFAR instruction, so that the branch prediction unit 17 can provide a prediction vector indicating the past "m" branches performed by the program. Then, the branch prediction unit 17 makes a prediction for the next "m" number of conditional branches by providing a "branches outcome prediction vector" using the IFAR address. This vector is a string of bits in which each of up to "m" bits represents a sequence of branches in the program, each bit having a 1 state if it represents a branch taken and having a 0 state if it represents a branch not taken. These branches occur at the ends of basic blocks in the program.

This invention matches the current "branches outcome prediction vector" with the Sector branches Outcome" field in the FHT entries of the FHT set associated with the AIC row R determined by the current IFAR address. An FHT hit is obtained if the sequence of branches predicted in the vector is the same as the sequence of branches indicated in the "sector branches outcome" field of any of the FHT entry in the FHT set. Then, plural sectors in the associated row may be selected and outgated to the ISB in the order specified by the plural subfields in the "sector arrangement" field of the hit FHT entry. The sequence of instructions in the ISB is executed by the processor and checked for being in the order required by the program to verify the correctness of the prediction.

As a result of this invention, fast execution is obtained for non-sequentially located instructions found in the execution sequence of a program. That is, this invention utilizes the fact that instruction sequencing predictions have been found to have an accuracy of over 95 percent, so that over 95 percent of the time, the predicted sequence enables the immediate execution of a plurality of up to "m" number of non-sequentially located basic blocks without having to wait for the slow fetching of non-sequentially located instructions in the execution sequence, as had been required in prior art processors. A very small percent of the instructions executed by the program are required to be corrected by re-execution.

For example, if the current prediction vector contains "01" for the first two branches in an "m" prediction, and a matching FHT entry is found among the four entries in the illustrated FHT set to have a "Sector branches Outcome" field, 0*1*, the asterisks * are ignored for matching purposes and their is a match. Then, the "Sector Arrangement" in this entry controls the outputting of instructions from the associated AIC row to the "instruction sequencing buffer" (ISB); suppose the "Sector Arrangement" field in the hit FHT entry contains "0124", which causes an instant outputting of the instructions in the sectors V, and U (in that order) to be forwarded to 1SB during the current fetch cycle, regardless of where these instructions non-sequentially reside in the system hierarchy storage where they may reside in different memory lines of instructions. The "next IFAR instruction" in the hit FHT entry will also indicate where in the AIC the next required sector of instructions is immediately available for execution, regardless of where in the system storage it actually is stored. For example, suppose the "next IFAR instruction" field contains address Y. Then, Y is the address of the next-to-be-executed instruction in the program, and Y is loaded into the IFAR to set it up for beginning the next instruction fetch cycle without waiting to obtain it in the conventional slow way.

The initial FHT entry for an FHT set is generated while the sectors are being written into the associated AIC row R, which allows the initial FHT entry to have a special setup of indicating its sectors are to be outputted in sequential order (i.e. sector order 0, 1, 2, and 3 indicated in its "sector arrangement" field). Thus, when such initial FHT entry has an FHT hit it controls the sector outputting in the 0, 1, 2, and 3 order. Any other FHT entry in the same set will control sector outputting in another order in its "sector arrangement" field.

Description of Specific Process

FIGS. 4 through 8 describe the specific process performed by the preferred embodiment in the hardware represented in FIG. 1.

FIG. 4 illustrates initialization operations and basic FHT control operations. At the initial operation 401, a program starts execution in a processor of which only the processor portions novel to this invention are shown; the remainder of the processor may be assumed to be constructed and operate as found in the prior art. Then operation 402 sets a processor's Instruction Fetch Address Register (IFAR) to the first instruction address in the program by setting therein a virtual address of the first instruction to be executed in the program.

The processor then uses the IFAR address in its next operation 403 which obtains a prediction for the next "m" branches in the program, starting with the instruction addressed by IFAR. The prediction operation 403 includes obtaining a "branches outcome prediction vector" (as previously described herein). The process of obtaining the prediction and its vector starts a "fetch cycle" of this invention for an attempt to fetch the instructions in up to "m" number of basic blocks predicted in the execution sequence of the program from the instruction address in IFAR.

Each "branches outcome prediction vector" (vector) is generated as a sequence of bits which respectively correspond to the outcomes of a sequence of branch instructions in a corresponding "m" branch prediction. The position of each bit in the Vector corresponds to the position of a corresponding branch instruction in the "m" prediction, and the value of the bit indicates the outcome of the program operation at the branch, i.e. whether the corresponding branch instruction is predicted as taken or not taken. The basic blocks in each "m" prediction are determined by the IFAR address and the next "m" number of branches predicted.

Thus, the first basic block in an "m" branch prediction starts with the instruction at the IFAR address, and includes up to "m" basic blocks obtained with the target addresses of the branch instructions in the prediction. In the normal operation of the invention, the IFAR address is next obtained at the end of the last fetch cycle. The vector is therefore generated before the AIC or FHT is examined.

Then the process goes to operation 404, in which the IFAR address is used in a hashing algorithm (which may be conventional) to generate an address in the AIC directory to locate a row R associated with the IFAR address. Then the IFAR address is matched with each of the four "sector first addresses" in the AIC directory entry R to determine if any match exists. A match provides an "AIC hit" in the matching sector of the corresponding AIC row R, and the next operation 406 is entered. If no match is found, an "AIC miss" occurs, and the process goes to FIG. 7 at entry point F (shown by the notation, FIG. 7, (F)).

When an AIC hit occurs, the novel operation 406 accesses the associated FHT set using the novel relationships previously described herein between the selected AIC row R and the associated FHT set to determine if a FHT hit or miss is found. For doing this, operation 406 searches the "sector branches outcome" fields of the FHT entries in the FHT set for a match with the current "branches outcome prediction vector" to determine if any FHT hit exists. The "branches outcome vector" contains a sequence of branch indicators equal to or less than the number of sectors in any AIC row. However any sequence of sector numbers may be provided in the indicators of the vector.

A difference between the prediction vector (which contains a bit for each branch instruction in the prediction) and the "sector branches outcome field" in each valid FHT entry in the set is that the vector does not contain any information about the cache segmentation which is contained in each "sector branches outcome field".

That is, the prediction vector only contains a sequence of bits respectively representing the branch instructions in the prediction, while each "sector branches outcome field" also contains information about the segments in the same AIC row not containing any branch instructions. This difference is accommodated in this matching process found in the next described operations of this novel process.

An FHT entry can indicate any sequence of sectors within a single AIC row in its FHT entry's "sector arrangement" field, wherein each sector can only contain sequentially located instructions, and the different sectors in the row contain out-of-sequence instructions. A particular sector outputting sequence is indicated in each FHT entry's "sector arrangement" field, while the "sector branches outcome" field in the same FHT entry indicates the branch outcome state (taken, not-taken, or no-branch) occurring in each of these same sectors. On the other hand, the vector contains no information about any sector states that does not contain any branch instruction. Therefore this matching process uses each "no-branch" indication found in each "sector branches outcome" field to ignore a corresponding sector indicator in the same entry's "sector arrangement" field (which is used to control outputting of instructions from the sector to the ISB if an FHT hit is determined).

In next operation 407, the "sector arrangement" field, and the "next row address" field of the hit FHT entry are obtained. Within the "sector arrangement" field, "sector Indicator" subfields are sequentially accessed in left to right order. Each sector number stored in each accessed "sector indicator" subfield is used to select and outgate the indicated sector in the currently selected AIC row in the order in which they are listed in the field. The outgated sectors send their contained instructions to the ISB which feeds the processor's execution pipeline. This FHT-sequenced sector outgating from the selected AIC row enables the basic blocks in the AIC row to be outputted for execution in any sector order. Sector outgating stops when the end or a special character is reached in scanning the subfields of the "sector arrangement" field.

Then operation 406 adjusts the LRU bits in the LRU field of the FHT entry to indicate it is the most recently used entry in its FHT set.

Then in operation 409, the address in IFAR is stored into the "next IFAR address" field of the current FHT entry to enable the process to locate in another AIC row any next instruction in the predicted execution sequence. Then the instruction sequencing process re-enters operation 403 to obtain the next "m" branch prediction based on the new instruction address set into IFAR.

Although all sectors in the selected AIC row may be outgated in any sequence under control of the "sector arrangement" field, less than all the row's sectors may be outgated, including as little as one sector. Thus at least one "sector indicator" subfield (leftmost) is used in each "sector arrangement" field, and upto all of its "sector indicator" subfields may be used. A special character may be coded into one or more subfield(s) of the "sector arrangement" field to indicate sectors which are not to be outgated. The number of "sector indicator" subfields used for outgating in the FHT "sector arrangement" fields may therefore vary.

After the sector outgating is completed, the IFAR is set to the address stored in the "next row address" field before the process goes back to operation 403 for accessing from another AIC row containing the next instruction to be executed for the program. This next IFAR address enables the next "fetch control cycle".

This invention operates fastest when AIC and FHT hits are occurring in consecutive fetch control cycles, each started by the next "m" prediction in the manner previously explained. Accordingly, each fetch control cycle having hits can be immediately provided from the AIC a plurality of non-sequentially located basic blocks of instructions to the processor's execution process for the fastest processor execution of instructions.

When an AIC miss occurs in operation 404, the process goes to FIG. 5, where it performs operation 501. FIG. 5 operation 501 sets a sector count S to 0 (zero) to represent the first sector of the selected AIC row R. S is initially set to 0 to select the first (leftmost) sector in the current AIC row R. Also, a vector branch count B is set to 0 to represent an index to the first bit in the "branches outcome prediction vector". This initial setting of B will locate the first bit in the vector representing the first branch instruction following the instruction at the current address in IFAR. B will locate the vector bit to be compared to a sector subfield indicating either a branch taken or not taken, but it will not be compared to a sector subfield containing a no-branch instruction indication, which is skipped in the comparison process.

Next operation 502 selects an AIC row R by, for example, using the hashed IFAR address. Also, the operation selects the associated FHT set, and all four FHT entries in that set are invalidated.

Next operation 503 selects the first entry FHT(0) in the associated FHT set as the current FHT entry F. Then operation 504 stores the IFAR address into the "first instruction address" field of selected "initial" FHT entry F to indicate sector 0 is the first to be outputted to the ISB if this FHT entry is used again.

In the preferred embodiment, only the first FHT entry of the set, FHT(0) is generated on an AIC miss. Any of the other FHT entries in the set, FHT(2) . . . FHT(FT) are generated on an FHT miss. The total FHT entry count, FT, is an empirically determined number, involving a consideration of: The higher the value of FT, the more execution sequences can be represented in each FHT set for the associated AIC row, and also the more likely that some FHT entries will be unused in the FHT sets. The lower the value of FT, the more likely that FHT misses will occur, which may result in a reduction in the program execution efficiency gained in the use of this invention. The value of FT for a direct-mapped FHT may be determined by dividing the number of FHT entries in the FHT by the number of rows in the AIC, wherein the number of entries in the FHT is an integer multiple of the number of rows in the AIC. Then, a respective AIC row (located at an index R in the AIC) is associated with an FHT set containing FHT entries located at FHT indices: F*R, F*R+1 F*R+2 . . . F*R+(FT−1), which may be designated as FHT entries F(0), F(1) . . . F(F). In the preferred embodiment, FT=4, so that 4 FHT entries are associated with each row in the AIC, and they are located at FHT indices: 4*R, 4*R+1, 4*R+2 and 4*R+3 for FHT entries FHT(0), FHT(1), FHT(2) and FHT(3). A currently selected FHT entry is referred to as FHT entry F.

Operation 506 fetches instructions (starting at the IFAR address) sequentially from a memory line in the system memory hierarchy located by the address in IFAR. Fetching continues in the memory line until a branch instruction is detected, or until the end of the line is reached. A "sector branch control bit" H to H=1 may be set to indicate when a branch instruction is detected in the current sector, or set H=0 when no branch instruction is detected in the sector. Thus, upto LT (the number of instruction storage positions in each sector) are copied from the memory line into the current sector. If less than LT number of instructions have been copied into the sector, a NOP code is written into each remaining instruction locations in the sector to the right of the branch instruction. A n instruction count L counts the number of instructions copied into the sector NOPs are excluded from count L—and the branch control bit H indicates if the sector contains a branch instruction or no branch instruction.

Operation 508 copies the fetched instructions both into the ISB and into the S-th sector in the selected AIC row R in which its first sector 0 receives the first fetched block. The sectors will be selected in sequence 0, 1, 2 and 3 for copying fetched instructions, since S is incremented by one on each iteration through the process of generating the initial FHT entry. For example, the preferred embodiment has a sector size of eight instruction positions (LT=8), and if less than eight instruction are written in a sector (L<8), NOP padding is provided in the instruction positions of the sector between the branch instruction and the right side of the sector, so that the instruction sequence of one to eight instructions is always aligned with the left side of the sector in any row of the AIC Next-operation 509 stores the IFAR address into the "sector 1 address" field of the selected AIC director entry R.

Then the process goes to FIG. 6 to partially generate the selected FHT entry F in the associated FHT set to represent the current sector S in the sequence to be represented in the current FHT entry F.

Operation 601 stores S in the S-th subfield in the "sector arrangement" field of the current FHT entry F. This represents the instructions in AIC row sector 0 as the first sector to be outputted in the outputting sequence to be represented by this FHT entry.

Operation 601 stores the current sector count S into the S-th subfield in the "sector arrangement" field of the current FHT entry being generated. The sector count S is used as the subfield index in both the "sector arrangement" field and the "Sector Branches Outcome" field in the same FHT set. In any AIC row, the instructions are fetched from memory and written into the sectors of the selected AIC row in the execution sequence of the basic blocks of the program, and not in the location sequence found in the memory. This sector order written into the row is reflected in the "sector arrangement" field of the initial FHT entry in the FHT set for that row, so that subsequent executions of this same sequence in the program may be identified by the initial FHT entry so it can quickly output that sequence to the ISB. For example in the preferred embodiment, each initial FHT entry in any FHT set identifies the sector output order as sectors 0, 1, 2, and 3.

Next operation 602 determines if any branch instruction is stored in sector S, This may be done by testing if the "sector branch control bit" H has been set to H=1 which indicates that a branch instruction is stored in sector S. Then the next operation is 604. Thus, the state of the bit H indicates if a branch instruction, or no-branch instruction, was detected for the current sector S.

Operation 603 is performed If H tests as not being 1, then H=0 to indicate that no branch was detected in sector S, and operation 604 adds count L to the address in IFAR to obtain a new IFAR address.

At operation 606 (entered when H=0), an asterisk (*) is stored in the S-th subfield in the "sector branches outcome" field in the current FHT entry F. Then operation 607 Increments count S by 1 to provide the next value for count S. In the preferred embodiment, an asterisk (*) will be stored in a subfield of the "sector branches outcome" field to indicate no-branch instruction exists in the sector identified by the sector number in the corresponding subfield having the same subfield index in the "sector arrangement" field of the same FHT entry.

Operation 604 is performed when H=1. So far the process knows that a branch instruction exists in sector S, but it does not yet know whether that branch was taken or not. This is next determined by a test of the bit at the current index B in the current "branches outcome prediction vector", and this bit should represent the taken or not-taken state of the same branch instruction. If the bit at index B has a 1 state, the branch is predicted as taken, and a 1 is stored into the current subfield S of the "sector branches outcome" field. And then IFAR is set to the target address of this branch taken instruction. But if the bit at index B has a 0 state, the branch is predicted as not taken, and a 0 is stored into this subfield S to indicate the not-taken condition. Then, IFAR is incremented by the current count L to obtain the address of the instruction starting the next sequential sector in the AIC row for the branch not-taken.

After the bit at B is used, increment index B by one to locate the next vector bit. Then, sector count S is incremented by 1 for accessing the next sector in the row.

The next operation 608 determines if the last sector in the row has been used. Since there are 4 sectors in each AIC row (i.e. sectors 0, 1, 2 ,3), the highest sector is 3 and it increments to the next higher number 4 after the last sector is completed. (In general, if ST is the total number of sectors in each row, then if S will be incremented to ST+1 after the last sector is used. Then the test is whether S is equal to ST+1).

Thus if S is not equal to 4, then at least one sector has not been used in the row, and operation 611 is performed to check the IFAR address against the currently accessed "memory line" to determine if it contains instructions for the next sector.

If S=4, then no more sectors remain in the AIC row and operation 612 is performed.

In operation 611, if the memory line does not contain the current IFAR address, another memory line having the IFAR address is accessed. Then the process goes back to operation 506 in FIG. 5 (having entry C).

In operation 612, the processing of the current FHT entry is coming to an end, and the bits in its LRU field are set to indicate this is the most recently used FHT entry. Then, operation 614 sets the "next IFAR address" field in the "initial" FHT entry, and also set its "valid" field to indicate the entry now has a valid state, so it can now be used in the process shown in FIG. 4, which is next entered at operation 403 having entry (C).

When in FIG. 4 in operation 406, a FHT miss occurs after an AIC hit, a new FHT entry is to be generated by entering the process in FIG. 7.

In operation 701 in FIG. 7, an invalid FHT entry is found in the FHT set associated with the current AIC row containing the instruction currently addressed by IFAR. (The associated FHT set is located in the FHT at indices 4*R, 4*R+1, 4*R+2, 4*R+3, in which 4 is the number of entries in the FHT set). This invalid FHT entry is selected as the next FHT entry to be processed. If more than one invalid FHT entry exist in the FHT set, any of them may be selected, but a round-robin selection technique is assumed to be used here. If no invalid FHT entry(s) exist in the FHT set, operation 702 is performed to select the least recently used (LRU) one of the valid entries in the set, and it is selected, invalidated, and then used as the currently selected invalid FHT entry F in the set which is to be generated into a new FHT entry.

Operation 703 selects the invalid FHT entry as the "current FHT entry F". It then sets a subfield count C to 0 to locate the first subfield in the "sector arrangement" and "sector branches outcome" fields in the FHT entry. It also sets the sector count S to 0 to locate the first sector in the associated AIC row R.

Operation 704 continues the generation of the selected FHT entry F by setting the IFAR address into the "first instruction address" field in the FHT entry. It also sets the LRU field of the FHT entry to indicate the entry is most recently used in its set.

Then, operation 706 stores count S into the C-th subfield of the "sector arrangement" field in the entry. The next operation 707 selects sector S in the AIC row S and outputs its instructions to the ISB, and generates a count L of the number of outputted instructions from sector S.

The following operations in the FHT miss process, starting with operation. 708, store the subfields in the FHT entry. Operations 708, 711, 712, 708 and 714 are like previously explained operations 602, 603, 606 and 604 in FIG. 6.

The next operation 708 may determine if any branch instruction is stored in sector S by testing the state of the "sector branch control bit" H, which has been set to H=1 if a branch instruction is detected or remains H=0 if no branch instruction is detected when the instructions in the current sector S were being transferred to ISB.

When H=0 it indicate that no branch was detected in sector S, and operation 711 adds count L to the address in IFAR to obtain a new IFAR address.

Then operation 712 is entered when H=0, and an asterisk (*) is stored in the C-th subfield in the "sector branches outcome" field in the current FHT entry F. Then operation 801 in FIG. 8 Increments count C by 1 to provide the next value for count C. In the preferred embodiment, an asterisk (*) will be stored in a subfield of the "sector branches outcome" field to indicate no-branch instruction exists in the sector identified by the sector number in the corresponding "sector arrangement" subfield having the same subfield index in the same FHT entry.

Operation 714 is performed when H=1. So far the process knows that a branch instruction exists in sector C, but it does not yet know whether that branch was taken or not. This is next determined by a test of the bit at the current index B in the current "branches outcome prediction vector", and this prediction bit should represent the taken or not-taken state of the same branch instruction. If the bit at index B has a 1 state, the branch is predicted as taken, and a 1 is stored into the current subfield C of the "sector branches outcome" field. And then IFAR is set to the target address of this branch taken instruction. But if the bit at index B has a 0 state, the branch is predicted as not taken, and a 0 is stored into this subfield C to indicate the not-taken condition. Then, IFAR is incremented by the current count L to obtain the address of the instruction starting the next sequential sector in the AIC row for the branch not-taken.

After the bit at B has been used, increment index B by one to locate the next vector bit. Then in FIG. 8 operation 801 increments the current count C by 1. The value of C locates the subfields in the fields of the FHT entry F. It is to be noted that the previously-generated initial FHT entry in any FHT set contains sequentially-ordered sector numbers (1, 2, 3, etc.) in the subfields of its "Sector Arrangement" field, due to the execution-sequenced writing of basic blocks in the left-to-right order of the sectors in the associated row R. However, each later FHT entry may be generated to have a different sector sequence in its "Sector Arrangement" field for the same associated row R, unless the initial FHT entry had been invalidated due to being aged out by a later FHT entry. Furthermore, the current setting B of the "Branches Fetched Count" locates a "taken/not-taken" bit in the "outcome prediction vector" for the predicted branch instruction ending the basic block to be outputted from the current sector S of the current row R by the FHT entry. However, the current setting of bit B does not indicate which, if any, sector in the associated row R may contain this branch instruction.

The next Cth subfields in the "sector arrangement" and "Sector Branches outcome" fields will now be prepared using the incremented C value to locate the next subfield in each of these fields in the currently selected FHT entry F, provided that all 4 sectors have been examined as to whether they are in the outputted sequence of sectors for this FHT entry F. Therefore the current value of C is tested to see if it has exceeded the maximum number allowed for C, which is 3 since the first value of C is zero. Then, step 802 compares C to 4. If C is equal to 4, all sectors in the current AIC row R have been accounted for, and operation 804 is performed. But if C is not equal to 4, at least one other sector remains in the current AIC row R to be examined, and operation 803 is performed.

Operation 803 is next performed if all sectors have not been examined. Operation 803 accesses the AIC directory entry R to find if the directory entry has any "sector first address" field having the current IFAR address. If any of the directory entry fields compares equal with the IFAR address, then the sector number of that "sector first address" field represents the S value of the next sector in the executable sequence of instructions which are to be found in the associated row R.

If found, operation 807 sets the sector count S to the value of S found by step 803, and operation 706 in FIG. 7 is performed to set this S value in the current subfield at the C-th index in the "sector arrangement" field of the selected FHT entry F, and so on as previously explained for the operations in FIG. 7.

If operation 803 found that no "sector first address" field matches, operation 806 is performed, and it stores a 0 in the current Cth subfield of the "Sector Arrangement" field and stores an asterisk, *, in the current Cth subfield in the "Sector Branches Outcome" field of the FHT entry F. Then operation 808 increments C by 1, and then the incremented C is tested by operation 809 to determine if the last subfield C has been generated. If no, the remaining subfields are padded with asterisks * to indicate they do not represent any operation, and this is done by going back to operation 806 to perform the asterisk padding until step 809 determines all subfields have been handled, so that the process then goes to operation 811.

Operation 811 sets the valid bit field to 1 to indicate the valid state for the current FHT entry F. It also sets IFAR to the address of the next instruction located by the current IFAR address contained in the "Next IFAR Address" field in the current FHT entry F, so that the next AIC row may be found if any contains the next instruction to be executed (currently addressed by IFAR). The FHT entry generation is now completed, and the current fetch cycle is complete. Then, the process goes back to FIG. 4 operation 403 to start the next fetch cycle. The next instruction to be executed in the program is in IFAR.

The embodiment described above has a sequencing restriction because the "sector arrangement" subfield in all FHT entries of any FHT set have the same first sector, which is sector 0. Therefore, all FHT entries in any set identify the same first sector using the same IFAR address for their first subfield (i.e. when C=0) in their "sector arrangement" and "sector branches outcome" fields, but these FHT entries in any set have total sequencing flexibility in specifying their other subfields after the first subfield (i.e. where C=1, 2 or 3 for subfields 1, 2 and 3, respectively).

Total sequencing flexibility is however obtainable by a different embodiment using a sector directory (not shown) instead of, or in addition to, the AIC row directory shown in the preferred embodiment. Such a sector directory contains all "sector S first address" fields (shown for all rows in the AIC directory) preferably sorted in address sequence. Each address in the sector directory has an argument which is the location of the associated sector in the AIC. IFAR addresses would search the sector directory's "sector S first address" field, and an equal condition would be an IFAR hit which would use the associated AIC location to outgate it.

While I have described the preferred embodiment of my invention, it will be understood that those skilled in the art, both now and in the future, may make various improvements and enhancements which fall within the scope of the claims, which follow. These claims should be construed to maintain the proper protection for the invention first disclosed herein.

Having thus described my invention, what I claim as new and desire to secure by Letters Patent is:

1. Processor apparatus for significantly reducing time loss caused by execution of branch instructions and resulting branch target instructions in a program, comprising
    an instruction cache (I-cache) for receiving and storing groups of instruction blocks fetched from nonsequential locations in memory for execution by the processor apparatus,
    a branch instruction prediction unit (prediction unit) for predicting branch outcomes of a plurality of branch instructions immediately following an instruction being addressed for fetching in the program when the instructions have acquired a branch history during previous execution or compilation of the program,
    a Fetch History Table (FHT) containing FHT entries capturing an execution history sequence of instruction blocks stored in the I-cache, and
    gates for outputting the instruction blocks from the I-cache to an execution element under control of one of the FHT entries to provide the instruction blocks in the captured history sequence for execution by the execution element, further comprising
    a branches outcome prediction vector being provided by the prediction unit in response to inputting an instruction address to the prediction unit during execution of the program,
    FHT entry selection and actuation controls for selecting a valid FHT entry containing a branches outcome field which matches at least part of the branches outcome prediction vector, and
    an instruction sequencing buffer for receiving instructions from the I-cache in the history sequence captured in the FHT entry in response to the FHT entry selection and actuation controls.

2. Processor apparatus for utilizing an FHT as defined in claim 1, further comprising
    fetch cycle completion controls for determining when all blocks indicated in the history sequence in the FHT entry have been outputted to the instruction sequencing buffer to end a current fetch cycle for the program, and
    the prediction unit receiving a target address of a last branch instruction represented by the history sequence of the FHT entry for making a next prediction for initiating a next fetch cycle for the processor apparatus.

3. Processor apparatus for utilizing an FHT as defined in claim 2, further comprising
    each FHT entry in the FHT associated with a respective group of blocks stored in the I-cache and representing a particular history sequence of execution for the blocks in the group.

4. Processor apparatus for utilizing an FHT as defined in claim 3, further comprising
    a set of plural FHT entries provided in the FHT associated with a respective group of blocks stored in the I-cache, and
    each FHT entry in the set indicating a different history sequence of execution of the blocks in the respective group.

5. Processor apparatus for utilizing an FHT as defined in claim 4, further comprising
    a first FHT entry in the set recording the sequence of execution of the blocks in a group when the blocks of the group is stored in the I-cache, and
    each other FHT entry in the group recording a different history sequence of execution of the blocks in the program occurring after the group of blocks is written in the I-cache, wherein each FHT entry in the set records a different sequence of execution for the blocks in the group.

6. Processor apparatus for utilizing an FHT as defined in claim 1, further comprising a block sequence field being provided in each FHT entry for recording the history sequence in the FHT entry.

7. Processor apparatus for significantly reducing time loss caused by execution of branch instructions and resulting branch target instructions in a program, comprising an instruction cache (I-cache) for receiving and storing groups of instruction blocks fetched from non-sequential locations in memory for execution by the processor apparatus, a branch instruction prediction unit (prediction unit) for predicting branch outcomes of a plurality of branch instructions immediately following an instruction being addressed for fetching in the program when the instructions have acquired a branch history during previous execution or compilation of the program, a Fetch History Table (FHT) containing FHT entries capturing an execution history sequence of instruction blocks stored in the I-cache, and gates for outputting the instruction blocks from the I-cache to an execution element under control of one of the FHT entries to provide the instruction blocks in the captured history sequence for execution by the execution element, further comprising sectors being structured in the I-cache, and each sector containing a fixed number of storage positions for storing instructions in a sequence received from a memory or buffer containing all or a part of the program, each sector having a capacity for storing all or a part of a basic block of instructions in the program, each basic block starting at a beginning location in a sector when the basic block is stored in the I-cache, and the basic block ending at a location in the same sector or in another sector, any basic block stored in the I-cache occupying any number of instruction positions in one or more sectors, of which each basic block occupies at least the first instruction position of a sector, so that each basic block stored in the I-cache is aligned with a predetermined side of a sector, a no-instruction code (nop) being stored in each unoccupied instruction position in a sector, whereby the I-cache is structured as an aligned instruction cache (AIC).

8. Processor apparatus for significantly reducing time loss caused by execution of branch instructions and resulting branch target instructions in a program, comprising an instruction cache (I-cache) for receiving and storing groups of instruction blocks fetched from non-sequential locations in memory for execution by the processor apparatus, a branch instruction prediction unit (prediction unit) for predicting branch outcomes of a plurality of branch instructions immediately following an instruction being addressed for fetching in the program when the instructions have acquired a branch history during previous execution or compilation of the program, a Fetch History Table (FHT) containing FHT entries capturing an execution history sequence of instruction blocks stored in the I-cache, and gates for outputting the instruction blocks from the I-cache to an execution element under control of one of the FHT entries to provide the instruction blocks in the captured history sequence for execution by the execution element, further comprising the I-cache structured as a plurality of rows, each row containing a plurality of the sectors, and each sector storing instructions of no more than one basic blocks of the program, each basic block stored in the I-cache starting at a sector aligned location in a sector, and when the basic block exceeds the sector continuing the basic block into each sector until the end of the basic block is reached, but if the basic block needs to go beyond the end of the row using the instruction address of the first instruction exceeding the row to locate another row and continuing the basic block in the first and any needed contiguous sectors of the another row until the basic block ends in any sector in the I-cache, a next sector in the I-cache being accessed by using either: a target branch instruction if a branch-taken instruction exists at the end of the last basic block, but the next sector being a sector at a next following sector location if a branch not-taken instruction is at the end of the last basic block or if no branch instruction exists in the last sector accessed for a current basic block, sector arrangement information being stored in each FHT entry for indicating a sequence of sectors in the I-cache containing an execution sequence of instructions of the program in a predetermined number of sectors, and an I-cache directory containing directory entries having sector address fields, the sector address fields being respectively associated with the sectors in the I-cache, each sector address field receiving an address of any first instruction stored in the associated sector to enable a later-used program instruction address to locate any sector containing the instruction having that address by finding if any sector address field in the I-cache directory contains the program instruction address, since if the sector address field is found in the directory the associated sector contains the instruction in the I-cache.

9. Processor apparatus for utilizing an FHT as defined in claim 8, further comprising sector branches outcome information being stored in each FHT entry for indicating one of: "branch-taken", or "branch-not-taken", or "no branch instruction in sector" as the branch outcome for each sector indicated in the sector arrangement information of the same FHT entry.

10. Processor apparatus for utilizing an FHT as defined in claim 9, further comprising the prediction unit generating a prediction branch outcomes vector (prediction vector) at a current program execution address (program address) for which the prediction vector contains bits having states representing branch outcome predictions for a sequence of basic blocks in the program immediately following the program address, logic for finding if at least an initial portion of the prediction vector compares equal to the sector branches outcome information in any FHT entry in the FHT by having the finding operation ignore any outcome indication of "no-branch-instruction-in-sector" when the prediction vector does not contain any information about sectors not containing branch instructions, and the execution element receiving the instructions from each sector identified in the sector arrangement information of the FHT entry in the sequence indicated by the sector arrangement information in the FHT entry if the logic finds an equal comparison with the sector branches outcome information in the FHT entry.

11. Processor apparatus for utilizing an FHT as defined in claim 10, further comprising
an instruction sequencing buffer receiving the instructions from the sectors sequentially indicated in the FHT entry and forwarding the instructions in the order received to the execution element.

12. Processor apparatus for utilizing an FHT as defined in claim 11, further comprising
the sector arrangement information and the sector branches outcome information being stored in different fields in each FHT entry in the FHT.

13. Processor apparatus for utilizing an FHT as defined in claim 11, further comprising
a plurality of I-cache rows comprising the I-cache, each row containing a predetermined number of sectors, each row having a unique location in the I-cache,
a plurality of FHT sets of FHT entries being uniquely located in the FHT, each FHT entry in any FHT set having a location in the FHT determined by the location of an associated I-cache row in the I-cache.

14. Processor apparatus for utilizing an FHT as defined in claim 13, further comprising
a predetermined set number of FHT entries being provided in each FHT set, and
an index for each FHT set in the FHT being calculated by using the predetermined set number and an index of an associated I-cache row in the I-cache.

15. Processor apparatus for utilizing an FHT as defined in claim 14, further comprising
a valid field being structured in each FHT entry in the FHT to indicate the FHT entry is usable for controlling the I-cache, and
a replacement field being structured in each FHT entry to indicate which entry in the set is least recently used (ERU) and is a next candidate for replacement.

16. Processor apparatus for utilizing an FHT as defined in claim 15, further comprising
a first instruction field in each valid FHT entry to indicate an address of the first instruction in any sector of the associated AIC row which is to be outputted first in the execution sequence indicated by the sequence information in the associated FHT entry.

17. Processor apparatus for utilizing an FHT as defined in claim 16, further comprising
a next instruction address field in each valid FHT entry to indicate an address of an instruction which (in the execution sequence of the program) is to follow the last instruction in the sector sequence indicated in the FHT entry.

18. Processor apparatus for utilizing an FHT as defined in claim 10, further comprising
the sector arrangement information and the sector branches outcome information being stored in the same field in each FHT entry in the FHT.

19. Processor apparatus for significantly reducing time loss caused by execution of branch instructions and resulting branch target instructions in a program, comprising
an instruction cache (I-cache) for receiving and storing groups of instruction blocks fetched from non-sequential locations in memory for execution by the processor apparatus,
a branch instruction prediction unit (prediction unit) for predicting branch outcomes of a plurality of branch instructions immediately following an instruction being addressed for fetching in the program when the instructions have acquired a branch history during previous execution or compilation of the program,
a Fetch History Table (FHT) containing FHT entries capturing an execution history sequence of instruction blocks stored in the I-cache, and
gates for outputting the instruction blocks from the I-cache to an execution element under control of one of the FHT entries to provide the instruction blocks in the captured history sequence for execution by the execution element,
further comprising
a branches outcome prediction vector being provided by the prediction unit in response to inputting an instruction address to the prediction unit during execution of the program,
FHT entry selection and actuation controls for selecting a valid FHT entry containing a branches outcome field which matches at least part of the branches outcome prediction vector, and
an instruction sequencing buffer for receiving instructions from the I-cache in the history sequence captured in the FHT entry in response to the FHT entry selection and actuation controls, and,
further comprising
a sector arrangement field in each FHT entry for storing a history sequence of a group of sectors containing instructions in the I-cache, and
a branches outcome field being provided in each FHT entry for recording an outcome which includes the conditions of taken or not-taken for each block represented in the sector arrangement field in the FHT entry.

20. A processor method for instantly sequencing for execution instructions obtained from multiple basic blocks of a program stored in a computer system by utilizing an execution history of a previous execution of the program, comprising
using fetch cycles to sequence instructions of the program for execution, in which each fetch cycle may sequence for execution the instructions contained in up to "m" number of multiple basic blocks of the program,
starting each fetch cycle by using an instruction address which is initially an entry address in a program and thereafter is a target address obtained from a last branch instruction in the previous fetch cycle until program execution is completed, the entry address and the target address each being a cycle starting address of a fetch cycle,
obtaining a prediction vector at the start of each fetch cycle by utilizing the starting address, the prediction vector including as string of state bits in which each state bit indicates a taken or not-taken state for each of "m" number of branch instructions predicted to next occur in the program execution sequence,
searching for the cycle starting address in an aligned I-cache (AIC) directory for determining if any AIC row (in an associated AIC) contains an instruction having the cycle starting address, and indicating an AIC hit if the instruction is found in an AIC sector in an AIC row, but indicating an AIC miss if the instruction is not found in the AIC,
if an AIC hit is indicated, locating a fetch history table (FHT) set of FHT entries in an FHT associated with the found AIC row, comparing the prediction vector with "sector branches outcome" information in the FHT entries of the located FHT entry, and selecting any FHT entry in the FHT set having the FHT hit, and if no FHT entry in the set has an FHT hit a FHT miss occurs, and if a FHT hit occurs, outputting for execution the instructions in AIC sectors indicated in "sector arrangement" information in the FHT entry by controlling the outputting of the sectors in a sequence indicated in the "sector arrangement" information of the FHT entry.

21. A processor method for instantly sequencing for execution instructions obtained from multiple basic blocks of a program as defined in claim 20, further comprising if an AIC miss occurs, use the cycle starting address to select in the AIC directory a directory entry associated with the AIC row, each AIC row containing a predetermined number of sectors, each sector having a predetermined number of instruction storage positions, select in the FHT a FHT entry associated with the selected AIC row, invalidate the selected AIC row and invalidate the selected FHT entry in preparation for setting them up for future use, locate a memory line containing an instruction at the fetch cycle starting address in a storage hierarchy of the computer system, start fetching instructions at the cycle starting address in the memory line and copy the fetched instructions into the first sector in the row starting at an alignment instruction position of the sector, and ending the fetching and copying when a branch instruction is detected, the end of the AIC row is reached or the end of the memory line is reached, whichever occurs first, and continuing if necessary the fetching and copying in consecutive sectors in the AIC row, while updating the program instruction address as the fetching and copying proceeds, wherein a first basic block copied into the row ending in any sector of the row, also outputting the instructions for execution as they are being fetched and copied, storing the cycle starting address into the "sector first address" in the AIC directory entry for locating the first sector in the row, and storing a first sector indicator into a first sector position in a "sector arrangement field in the selected FHT entry, and storing into a sector S first address field in the selected AIC directory entry the program address of any first instruction in each corresponding sector, testing for any branch instruction in each sector receiving fetched instruction(s), and storing a sector identifier in a sector arrangement field of the selected FHT entry for each sector receiving fetched instructions, and storing a sector outcome indication for each fetched sector in each corresponding sector position of a sector branches outcome field in the FHT entry, in which each sector outcome indication indicates if each corresponding sector has no-branch-instruction, or has a branch-taken or a branch not-taken instruction, testing if all AIC sectors in the AIC row have received fetched instructions to determine if no sector remains to be processed in the selected AIC row. If available, select a next available sector and make it the current sector, update the current program instruction address (which is either a target address of the last copied branch instruction in the selected AIC row, or if the copying reached the end of the row, the updated program instruction address is incremented by the number of instructions copied into the row, if another sector exists, find the memory line containing an instruction at the current program instruction address, and start fetching instructions from that memory line at the current program address and start copying the fetched instructions for execution and into the currently selected AIC sector starting at an alignment instruction position in the sector, and end the fetching and copying when a branch instruction is detected, the end of the AIC row is reached or the end of the memory line is reached, whichever occurs first, continuing the fetching and copying in consecutive sectors in the AIC row, if required, while updating the program instruction address as the fetching and copying proceeds, until all sectors of the selected AIC row have instructions copied into them, store the starting program address into that sector's "sector first address" in the AIC directory entry, store a sector identifier for each next sector into the corresponding sector subfield in the "sector arrangement field in the FHT entry, test for any branch instruction in each next sector receiving any copied instruction(s), and store a sector outcome indication for each copied sector in each corresponding sector position of a sector branches outcome field in the FHT entry, in which each sector outcome indication indicates if each corresponding sector has no-branch-instruction, or has a branch-taken or a branch not-taken instruction, test if all AIC sectors in the AIC row have received copied instructions to determine if all sectors have been copied into in the selected AIC row, and then set a replacement field in the selected FHT entry to a most recently used state, set a "next program address" field in the selected FHT entry to the current program address, and set to a valid state a valid field in the selected FHT entry.

22. A processor method for instantly sequencing for execution instructions obtained from multiple basic blocks of a program as defined in claim 21, further comprising outputting for execution is performed by outputting to an instruction sequencing buffer which provides the instructions to an execution pipeline of a processor performing the method.

23. A processor method for instantly sequencing for execution instructions obtained from multiple basic blocks of a program as defined in claim 20, further comprising if a FHT miss occurs when an AIC hit occurs, select an invalid FHT entry in the FHT set, set to 0 a subfield index C to locate a current subfield C, set to 0 a sector index S to locate a current sector S, and set to 0 a vector bit index B to locate a current vector bit, set the current program address into a "first instruction field" in the selected FHT entry, adjust a replacement field in the selected FHT entry to indicated the most recently used state, store S in a subfield C in a "sector arrangement" field in the selected FHT entry in preparation for setting up the FHT entry for future use, output for execution all instructions contained in the sector S of the selected AIC row, test for any branch instruction sector S, and if no branch instruction exists in sector S store a "no-instruction"

code in subfield C of the selected FHT entry, and increment the program instruction address by the number of instructions outputted from sector S for execution, but if a branch instruction is detected in sector S, test current bit B in the prediction vector for a taken or not-taken state, and if the taken state is found, store a taken indication in subfield C of a "sector branches outcome" field in the selected FHT entry, and set the program instruction address to a target address of the branch instruction detected in sector S, but if the not-taken state is found, store a not-taken indication in subfield C of the "sector branches outcome" field in the selected FHT entry, and increment the program instruction address by the number of instructions outputted from sector S for execution, increment subfield C by 1 to obtain a new current subfield C, and test the incremented value to determine if it indicates all sectors in the AIC row have been serviced, if all sectors have been serviced, set a valid field in the selected FHT entry to a valid state, and set the current program instruction address to a new value obtained from a "next program instruction address" field in the selected FHT entry, then use the new value of the program instruction address to start a next fetch cycle, but if the test of the incremented value of subfield C indicates not all AIC sectors have been serviced, the selected AIC directory entry is accessed, search "sector first address" fields in the selected AIC directory entry for any that matches the current program instruction address, a sector hit occurs if any of these fields matches and the matching field identifies a corresponding AIC sector which requires service and now becomes the selected AIC sector (which may be at any sector location in the selected AIC row), then start a fetch cycle for the newly selected AIC sector, and repeat the process for each next subfield C until subfield C reaches a value indicating all sectors have been serviced, then set the selected FHT entry to valid state and set its replacement field to indicate a most recently used state, but if no sector hit is found during the search of the AIC directory entry, a sector miss occurs, and then write no-operation characters in any remaining subfields in the "sector arrangement" and "sector branches outcome" fields of the selected FHT entry, and set the current program instruction address to a value found in the "next program instruction address" field of the current AIC row, and start a next fetch cycle.

24. A processor method for instantly sequencing for execution instructions obtained from multiple basic blocks of a program as defined in claim 23, further comprising outputting for execution is performed by outputting to an instruction sequencing buffer which provides the instructions to an execution pipeline of a processor performing the method.

* * * * *

UNITED STATES PATENT AND TRADEMARK OFFICE
CERTIFICATE OF CORRECTION

PATENT NO. : 6,247,097 B1  Page 1 of 1
DATED : June 12, 2001
INVENTOR(S) : Sinharoy It is certified that error appears in the above-identified patent and that said Letters Patent is hereby corrected as shown below:

<u>Column 25,</u>
Line 40, reads "(ERU)" should read -- (LRU) --.

Signed and Sealed this

Twentieth Day of August, 2002

Attest:

JAMES E. ROGAN
Attesting Officer  Director of the United States Patent and Trademark Office